United States Patent
Hancock et al.

(10) Patent No.: US 7,489,637 B2
(45) Date of Patent: Feb. 10, 2009

(54) METHOD OF ENHANCING THE EFFICIENCY OF DATA FLOW IN COMMUNICATION SYSTEMS

(75) Inventors: Robert Hancock, Bitterne Park (GB); Mark Alan West, North Baddesley (GB)

(73) Assignee: Roke Manor Research Limited, Romsey (GB)

( * ) Notice: Subject to any disclaimer, the term of this patent is extended or adjusted under 35 U.S.C. 154(b) by 666 days.

(21) Appl. No.: 10/466,598

(22) PCT Filed: Dec. 12, 2001

(86) PCT No.: PCT/EP01/14857

§ 371 (c)(1),
(2), (4) Date: Mar. 17, 2004

(87) PCT Pub. No.: WO02/49293

PCT Pub. Date: Jun. 20, 2002

(65) Prior Publication Data

US 2005/0041582 A1  Feb. 24, 2005

(30) Foreign Application Priority Data

Dec. 16, 2000  (GB) .................. 0030709.0

(51) Int. Cl.
*G01R 31/08* (2006.01)
*H04J 3/16* (2006.01)

(52) U.S. Cl. .......................... 370/236; 370/465

(58) Field of Classification Search ............. 370/229, 370/235, 236, 465, 252, 253, 395.41
See application file for complete search history.

(56) References Cited

U.S. PATENT DOCUMENTS

| | | | | |
|---|---|---|---|---|
| 6,473,793 B1 * | 10/2002 | Dillon et al. | ............... | 709/223 |
| 6,501,732 B1 * | 12/2002 | Xu et al. | ............... | 370/235 |
| 6,687,227 B1 * | 2/2004 | Li et al. | ............... | 370/231 |
| 6,831,912 B1 * | 12/2004 | Sherman | ............... | 370/349 |
| 6,990,069 B1 * | 1/2006 | Ramakrishnan | ............... | 370/229 |

FOREIGN PATENT DOCUMENTS

WO  WO 00 51372 A  8/2000

OTHER PUBLICATIONS

"Implementation and Performance Evaluation of Indirect TCP" by Bakre et al., IEEE Transactions on Computer, vol. 46, No. 3, pp. 260-278, Mar. 1997.*

(Continued)

*Primary Examiner*—Kwang B Yao
*Assistant Examiner*—Tung Q Tran
(74) *Attorney, Agent, or Firm*—Crowell & Moring LLP

(57) ABSTRACT

A method of improving the flow of data in a communication system having at least two links, comprising inserting into one of said links at least one enhancer, the operation of which is to a) communicate with a the unit upstream of the data flow such that the upstream unit perceives that it is communicating with the unit (s) downstream of the enhancer; b) obtaining a measure of the efficacy of operation of the down stream unit(s), and c) dependent upon the measure, varying the control of data flow sent to downstream units.

9 Claims, 6 Drawing Sheets

OTHER PUBLICATIONS

Haas, Z.J. et al; "Mobile-TCP: an asymmetric transport protocol design for mobile systems" Communications, 1997. ICC '97 Montreal, Towards the Knowledge Millennium. 1997 IEEE International Conference on Montreal, Que., Canada June 8-12, 1997, New York, NY USA, IEEE, US—Jun. 8, 1997, pp. 1054-1058.

Kuang-Yeh, Wang et al: "Mobile-end transport protocol: an alternative to TCPIntellectual Property Group over wireless links", Infocom '98, Seventeenth Annual Joint Conference of the IEEE Computer and Communications Societies. Proceedings, IEEE San Francisco, CA USA Mar. 29-Apr. 2, 1998, pp. 1046-1053.

Balakrishnan, H. et al: "Improving TCPIntellectual Property Group performance Over Wireless Networks", Mobicom. Proceedings of the Annual International Conference o Mobile Computing and Networking, XX, XX, Nov. 1995, page—Complete.

Ajay, Bakre et al: "I-TCP: Indirect TCP For Mobile Hosts"; Proceedings of the International Conference on Distributed Computing Systems. Vancouver, May 30-Jun. 2, 1995, Los Alamitos, IEEE Comp. Soc. Press, US vol. CONF. 15, May 30, 1995, pp. 136-143.

Yavatkar, R. et al: "Improving End-to-End Performance of TCP over Mobile Internetworks" Proceedings, Workshop on Mobile Computing Systems and Applications, IEEE Computer Society Press, Los Alamitos, CA, US, Dec. 8, 1994, pp. 146-152.

* cited by examiner

METHOD OF ENHANCING THE EFFICIENCY OF DATA FLOW IN COMMUNICATION SYSTEMS

This invention relates to communication systems in general and has particular application to communication systems having a plurality of links where one link is considerably slower in terms of data flow than other links.

In order to illustrate the flow of data and its control in conventional systems, FIG. 1 shows a schematic representation of the communication system. Unit 1, which may be referred to as the sender (of information) represents a source of data to be transmitted and may be for example the Internet. This has a wire link with 2 to a wireless access base station 3. This wireless access base station communicates via radio links 4 to unit 5, A, B and C which in practice may comprise a number of mobile telephones.

Under a conventional operation known system unit 1 will send a packet of data to the wire station under standard Transmission Control protocol. (TCP). Under the TCP system, station B will send an acknowledgement to the sender that it has received the data packet and sender (or server) will double the transmission data rate and send two data packets. After receiving an acknowledgement that the base station has received these two data packets it will further double the data flow rate and send four data packets. This will continue until a maximum data transfer rate has been reached. The function of the base station is to forward on the data to mobile phones. As this second link is a radio link, the data transmission rate is considerably lower than that of the first link i.e. it has limited bandwidth. As the wireless access base station has finite buffer storage space and has to handle incoming data and acknowledge it as well as controlling and sending forwarded-on data packets, errors will occur such as loss of data packets. Under TCP data packet loss will be recognised by different mechanisms such as not receiving an acknowledgement for a particular data packet within a predetermined time or by the numbered data packets being out of synchrony. In the latter cases the base station will for example will send duplicate (or repeated) request for data packet No. 3, e.g., should data packets Nos. 4 and 5 etc come after data packet No. 2. When the server recognises data packet loss it will re-send the lost data and assume it is sending the data too fast. As a consequence it will half the data transmission rate. Further data packet losses will again further half the data transmission rate and result in meltdown. As consequence the server cannot do anything else and the data flow rate is severely slowed down and time is required for the data transmission rate to be ramped up again.

In summary therefore TCP implements a number of algorithms under the general heading of 'congestion avoidance'. These are designed to make TCP 'reactive' to congestion in the network and to control its sending rate to avoid causing 'congestion collapse'. This is a very real danger in the Internet, and so the algorithms are essential. The important aspects of congestion avoidance are these:

slow-start—an exponential increase in the TCP sending rate. Slow start is performed on every new connection; after a connection has been idle for some time; and after a retransmission timeout has occurred.

fast-retransmit/recovery—dropped packets can be detected by duplicate acknowledgements. When this happens the current sending rate is effectively halved and then increases linearly.

In summary therefore, the wireless access environment and other communication scenario's present a set of challenges to achieving a high level of TCP performance such as limited bandwidth, variable bandwidth, long latency and possible lengthy disconnections It is an object of the invention to limit and prevent packet loss events and to manage the flow of data to make the optimum usage of transmission sources in a balanced way, and to reduce the possibility of overflowing available buffer resources and thus to increase the overall efficiency of the system.

The invention comprises a method of improving the flow of data in a communication system having at least two links, comprising inserting into one of said links at least one enhancer, the operation of which is to a) communicate with a the unit upstream of the data flow such that the upstream unit perceives that it is communicating with the unit (s) downstream of the enhancer;

b) obtaining a measure of the efficacy of operation of the down stream unit, and c) dependent upon the measure adjustably varying the control of data sent to downstream units.

The enhancer, by sending out data more smoothly and controllably and at a rate at which the downstream units can handle, data packet loss can be minimised or eliminated. Moreover, the enhancer can make optimum use of fast links such as would be usual for the link between sender and enhancer. The enhancer can rapidly send out acknowledgements to the sender that it has received data or not without the sender having to wait for units downstream (with slower links) to send back acknowledgements. In prior art systems, the sender may have sent many data packets out during the time after which there has been overload and data loss which would be a waste of time.

By doing this, flow control and congestion management is no longer performed end-to-end, as would happen with ordinary TCP. This is important, as the wireless link has very different characteristics from the other, terrestrial, hops that packets will use. By splitting the connection, rather than simply acting as a router, the enhancer can control access to the wireless resource without having to drop packets. This is a significant advantage over a bottleneck router which, if overwhelmed with data, would have to discard packets.

An important point for the use of asymmetric enhancers according to the invention, is that once a packet has reached the interface to the wireless link, the data is transferred to the mobile station via a point-to-point link. This link is not shared and cannot suffer from congestion. It is also important to note that the network attached to the mobile is a 'stub' network. That is, there are no networks beyond it that are routed through it. Because of these points, it should be seen that congestion control mechanisms are not required once the wireless link has been reached. This, then, is the how the enhancement is achieved. The connection is split at the enhancer. A TCP flow that is regenerated back into the Internet remains a standard, responsive, TCP. A TCP that is regenerated towards a mobile, however, has the congestion avoidance mechanisms removed. In this way, the protocol used by the enhancer is fully interoperable with the host attached to the mobile station—all the datagrams are perfectly standard TCP/IP. The performance is enhanced because congestion avoidance is not performed over a link for which it is inappropriate.

The air interface used to communicate with the mobile stations has a fixed maximum capacity. However, the actual rate at which user data can be passed over the link depends upon the link error rate and the split between up-link and down-link.

Since the connection is split at the enhancer it is possible to adjust not only congestion avoidance but also the retransmission strategy between the enhancer and a mobile host. Again, the link characteristics are sufficiently different from the wired Internet case that this is a useful exercise.

The invention will now be described by way of example only and with reference to the following figures of which:

Figure 1:
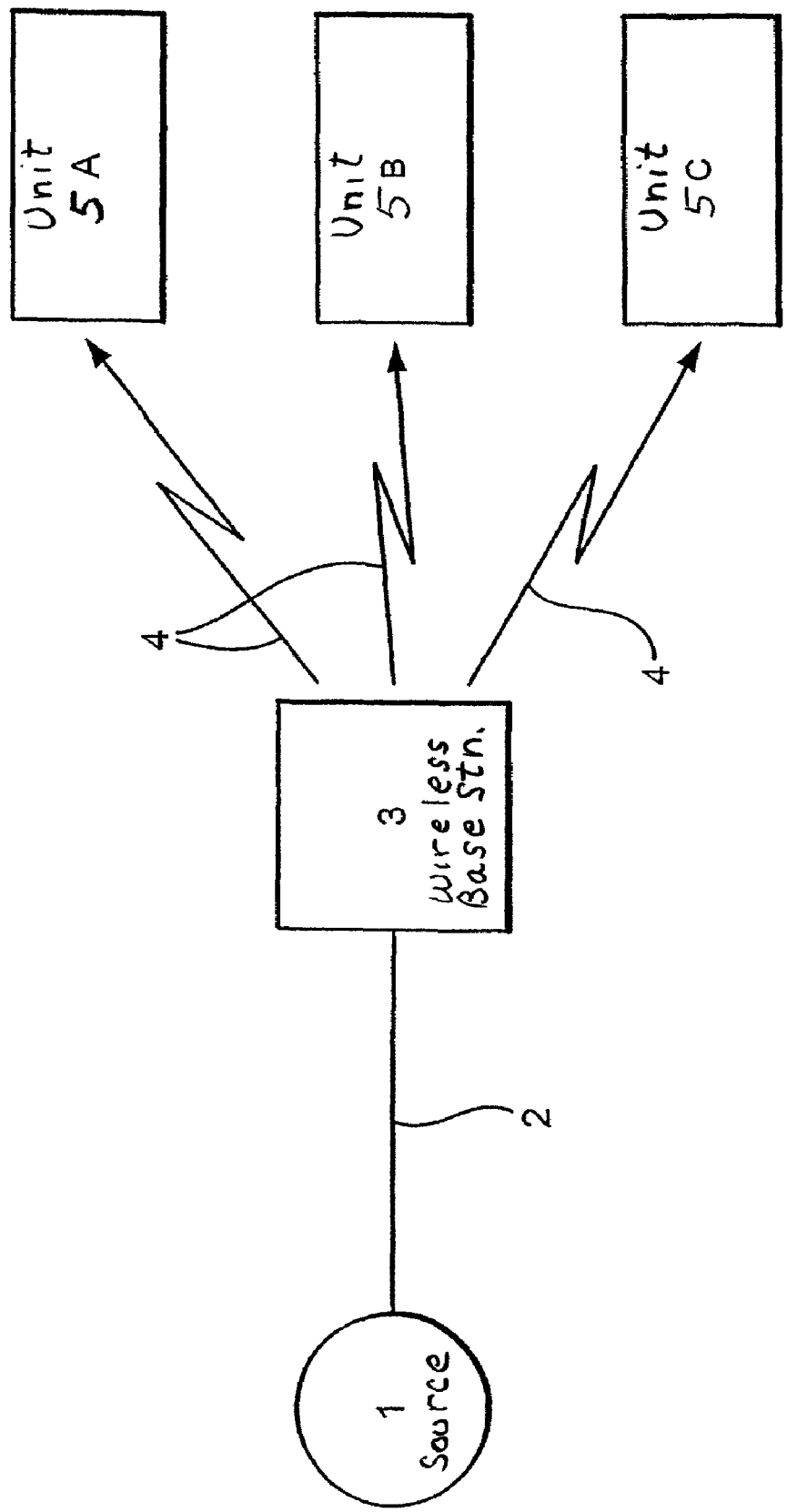
FIG. 1 shows a simple schematic figure of a prior art system.
Figure 2:
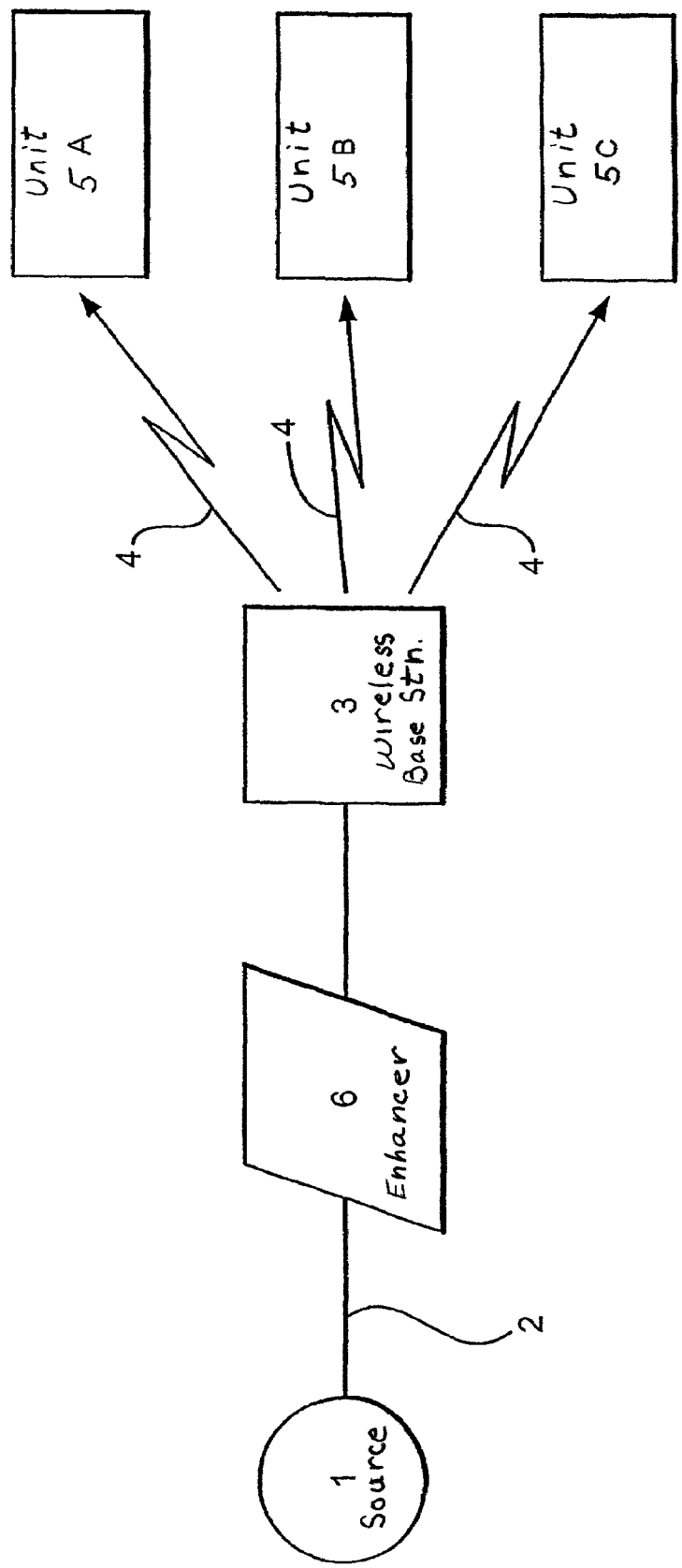
FIG. 2 shows a basic embodiment of the invention applied to the system shown in FIG. 1 which includes an enhancer.

FIG. 2 shows a simple embodiment of the invention comprising essentially the same features of FIG. 1 but with the additional insertion of an enhancer 6 located between the Internet server and the wireless Access Base Station. The enhancer effectively isolates or splits the communication system into two halves and operates such that perceived problems on one side of the enhancer do not affect the operation on the other side. Connection splitting is the key mechanism for enabling TCP performance enhancement. Rather than allowing the TCP connection to run end-to-end, as usual, the connection is segmented. The enhancer terminates a TCP connection on one interface and re-generates it on another. Connection Splitting is done by a technique referred to in the art as "spoofing", whereby the enhancer forges an acknowledgement to the sender to say I am the wireless base station, so that as far as the sender is concerned the connection is terminated at the enhancer. The enhancer operates with downstream systems and units to send data out to these in a more controlled, aggressive and thus efficient manner in an adaptive fashion using knowledge of the how the downstream systems are functioning. In other words the enhancer obtains a measure of how well downstream units are working, or clogged up the downstream systems are; and sent out data controllably and such that it does not give the downstream units more than they can handle and such that data packet loss does not occur.

One way in which this may be implemented is by the enhancer using a modified TCP to communicate with downstream units, which is compatible with the links but which is adaptive. The term adaptive here means that the TCP can be adapted to vary according to knowledge of the type of link and units i.e. systems downstream and how it is operating.

There are many ways in which the enhancer can obtain a measure of how the downstream units are currently operating. In general not only can the enhancer use knowledge about the type of links and systems downstream therefrom, such as whether they are mobile telephone links, but also it can obtain feedback in various ways to get a knowledge of how these downstream system are functioning and accordingly control the data flow rate to these systems.

The effective splitting of the system by the enhancer also means that, because it pretends to be the downstream systems, it can communicate back to the server to send early feed-back of acknowledgements because it does not have to wait for acknowledgements to come from the systems further downstream, which conventional takes longer, due to the distance of the network and the slowness of links downstream. Thus the nature of the rapid link between the enhancer and server means that any dropped packets can acknowledge and retransmitted fast. Such quick communication without reliance on downstream acknowledgement, results in high usage and efficiency of this link, thus allowing high data transmission rates from the server to the enhancer.

The enhancer will contain a buffer, but this does not have to be larger than may be thought initially as because the enhancer, as already mentioned can increase the data transmission rate of forwarded on data packets because of its smart efficient control there of as described above.

The following give examples of how the enhancer is adaptive according to the nature of operation of the downstream systems.

EXAMPLE 1

Measurement of Round Trip Time

Figure 3:
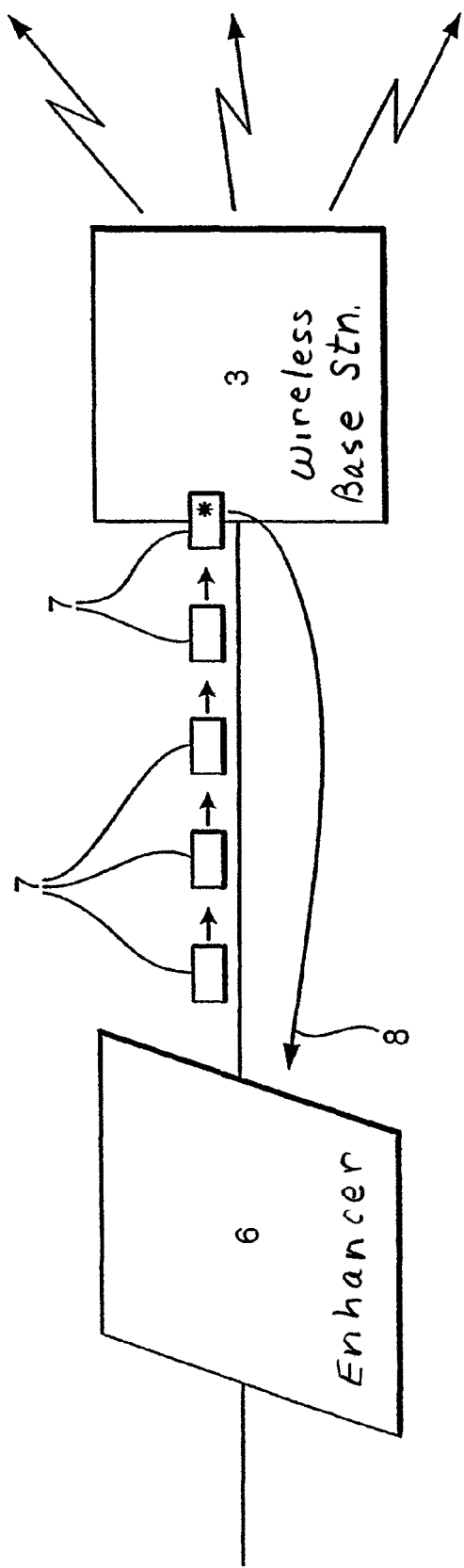
FIG. 3 show one embodiment of the system where the build up of data to units downstream is monitored by the enhancer.

FIG. 3 shows a schematic drawing of a communication system to illustrate this embodiment. Again the figure is similar to that of the previous figures but additionally shows a buffer of a wireless access station. The radio link to the station would have a fixed capacity i.e. fixed buffer capacity e.g. 64 Kbytes. The radio station sends data over a radio link to one or more host e.g. mobile telephones. Data sent to the mobile host in the form of data packets 7 will cause an acknowledgement 8 to be sent back to the enhancer. These acknowledgements are either sent immediately on receipt of a packet, or, under certain circumstances after a short delay (typically in the order of 200 ms). If the rate at which the packets are sent to the host remain less than the available bandwidth then there will never be more than 1 data packet in the buffer and the round trip time will remain relatively steady. The round trip time is defined as the time between sending a data packet and receiving an acknowledgement. If the rate of sending increases above the available bandwidth then the buffer will start to fill up and which could lead to buffer overload. The buffer will also drain at the rate determined by the available bandwidth. The effect of this is that the RTT will appear to increase. This will continue all the time until the sending rate is too high and the buffer will fill up and packet loss will result.

The enhancer uses measurement of RTT (assuming the buffer is of adequate size) to indicate the degree to which the link is being over-utilised, and to slow down the data transmission rate accordingly. Thus the enhancer adapts, in a dynamic fashion, the transmission rate according to the increase in RTT.

EXAMPLE 2

Aggregate Monitoring

Many protocols such a TCP use a "sliding window" as an effective means of flow control. The window is the maximum amount of data that a sender can output without receiving an acknowledgement, which is a useful technique in limiting the ability of a system to flood a downstream network. Thus, knowing the data packet size, the downstream buffer size and number of unacknowledged packets can slow down accordingly to ensure no buffer overflow occurs It is important that the window is large enough to support the maximum. Typically the window is sized according to the delay bandwidth product of the link)

A problem with this is that this sizing is carried out by each link, a link being defined as between two units. If there are multiple simultaneous connections on one link, this has the effect of multiplying the effective window size which can prove a problem in terms of controlling buffer usage and can lead to bursty network arbitration and synchronisation effects.

Figure 4:
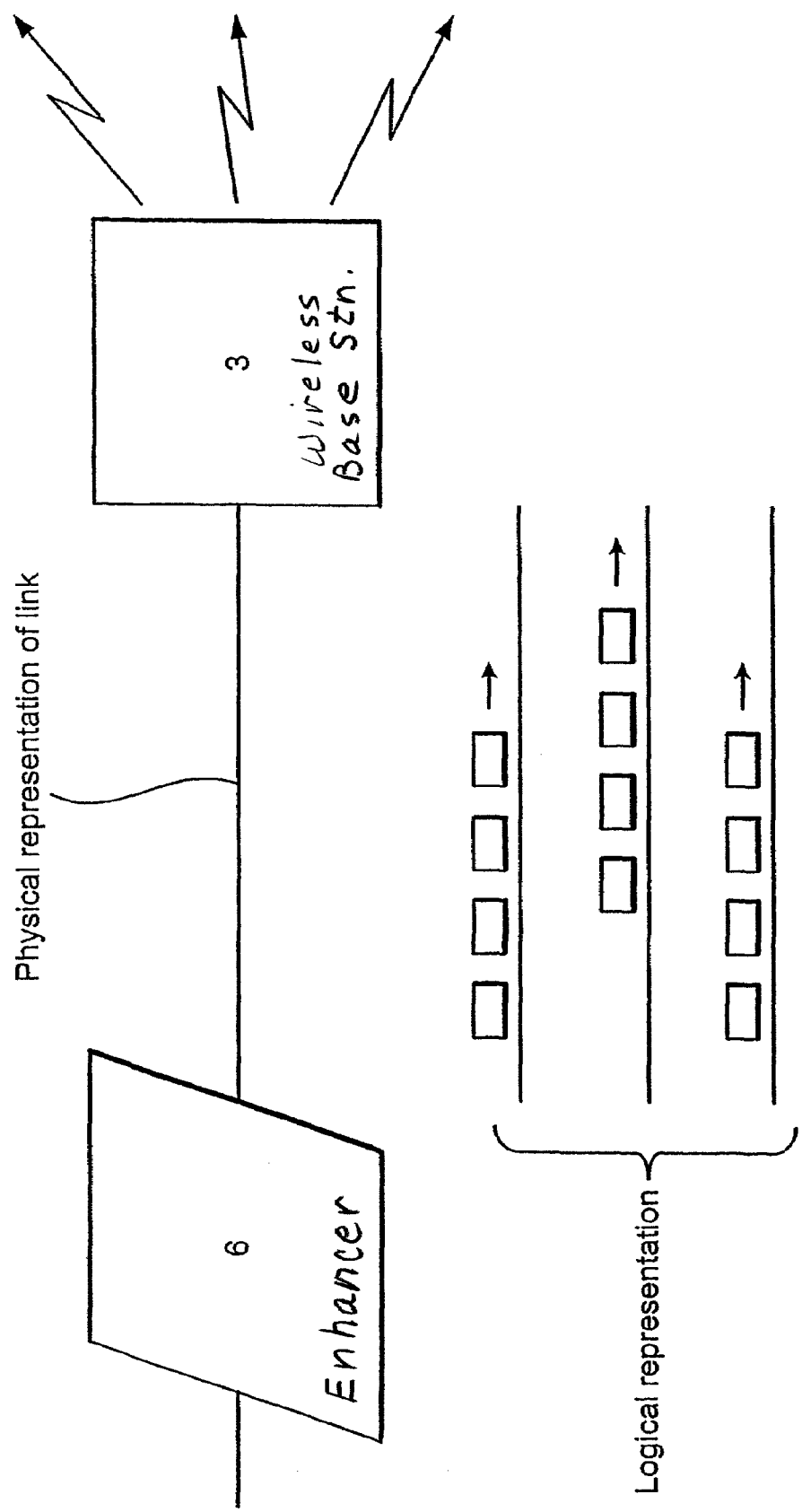
FIG. 4 shows physical and representation of a further embodiment of the invention where there is one link with three connections.

In one embodiment of the invention this problem is overcome by the use of an aggregate window where each connection uses its own window as normal but that an overall window is applied to all connections. This is illustrated in FIG. 4. Between the enhancer and the destination operate a multiple of connections, in the example three of them, that are operating simultaneously. If each connection allows a window size of 10 kb, for example, but the buffer at the end destination only has 20 kb, then flooding of the buffer will occur. In order to prevent such data loss and thus minimise re-sending the enhancer control is such that it can only output data on a particular connection of a link if that connection window is not full AND the aggregate window is not full. In other words, the enhancer sums the amount of unacknowledged data packets are outstanding for each connection and ensures that if the sum or aggregate is greater than a predetermined size then no further data will be sent to the unit.

EXAMPLE 3

Aggregate Rate Monitoring

Yet another way in which the enhancer can obtain quantitative Measurements of how data is flowing downstream will now be described. Often in a communications link, a base station for example, data flow from a server will be of mixed type; there may be data packets of a varied nature. As an example, some data packets such as audio or video data packets are unacknowledged data packets (UDP) that is to say that once received by a unit, an acknowledgement is not sent to the originator. In these instances, if the (UDP) is lost, then there is no point in re-sending as these data packets need to be sent smoothly i.e. in order. Data packet loss is not that critical and merely causes a momentary blip in a video or audio signal.

Figure 5:
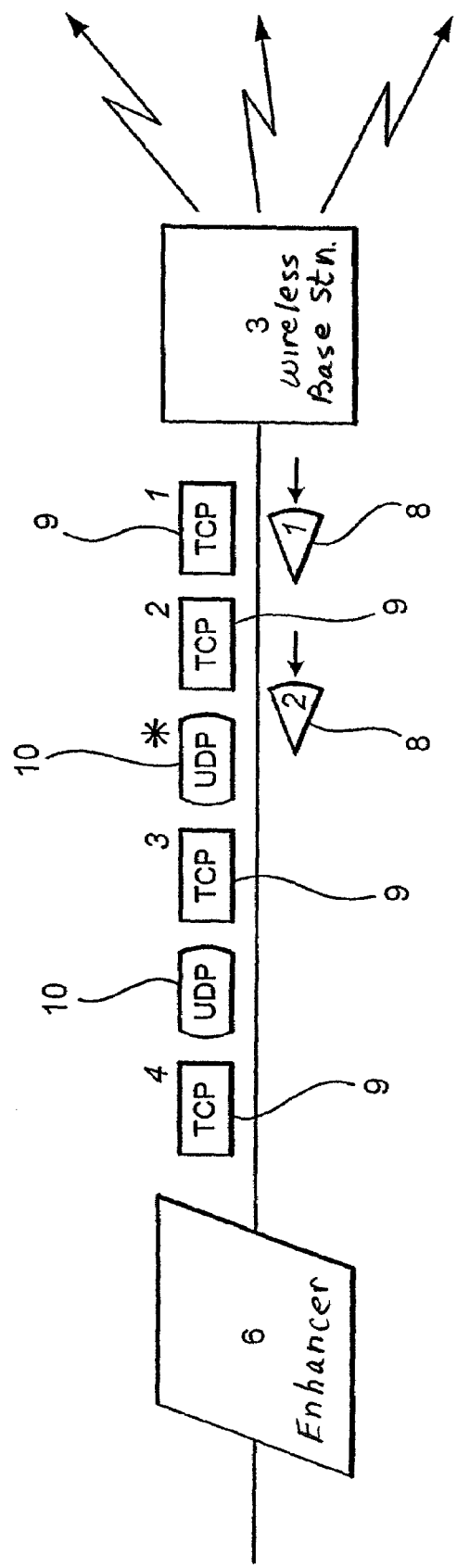
FIG. 5 shows a further embodiment of the invention whereby the amount of unacknowledged data sent downstream can be monitored.

For such mixed data transmission, there arises a problem in that the Enhancer receives no information as to the progression of UDP's because the UDP's are not acknowledged and so the enhancer does not know whether they have arrived or been lost. The inventors have provided an innovative way of allowing the enhancer to determine how the UDP's are fairing by making use of the fact that all data packets, both acknowledged and unacknowledged, are sent out in a contiguous order. By "pinning" the unacknowledged packets to acknowledged packets it is possible to determine whether the UDP's have arrived. This is illustrated in FIG. 5. This shows a flow of data between the enhancer and a downstream unit. The data flow comprises packets to be acknowledged under the TCP protocol (denoted TCP's) as well as unacknowledged packets (denoted UDP's). When data packet TCP1 has been processed and stored or forwarded without errors them an acknowledgement Ac1 is sent out. When data packet UDP1 arrives even if it has been stored or sent on without errors an acknowledgement is not sent. However when data packet TCP2 has been correctly stored or sent on without errors, the enhancer uses this to assume that the UDP1 has been stored correctly and without errors. Thus this gives the enhancer knowledge of the outstanding data, how much buffer space has been taken up and data rate on and thus can be used in conjunction with any of the above techniques.

Software Architecture

Figure 6:
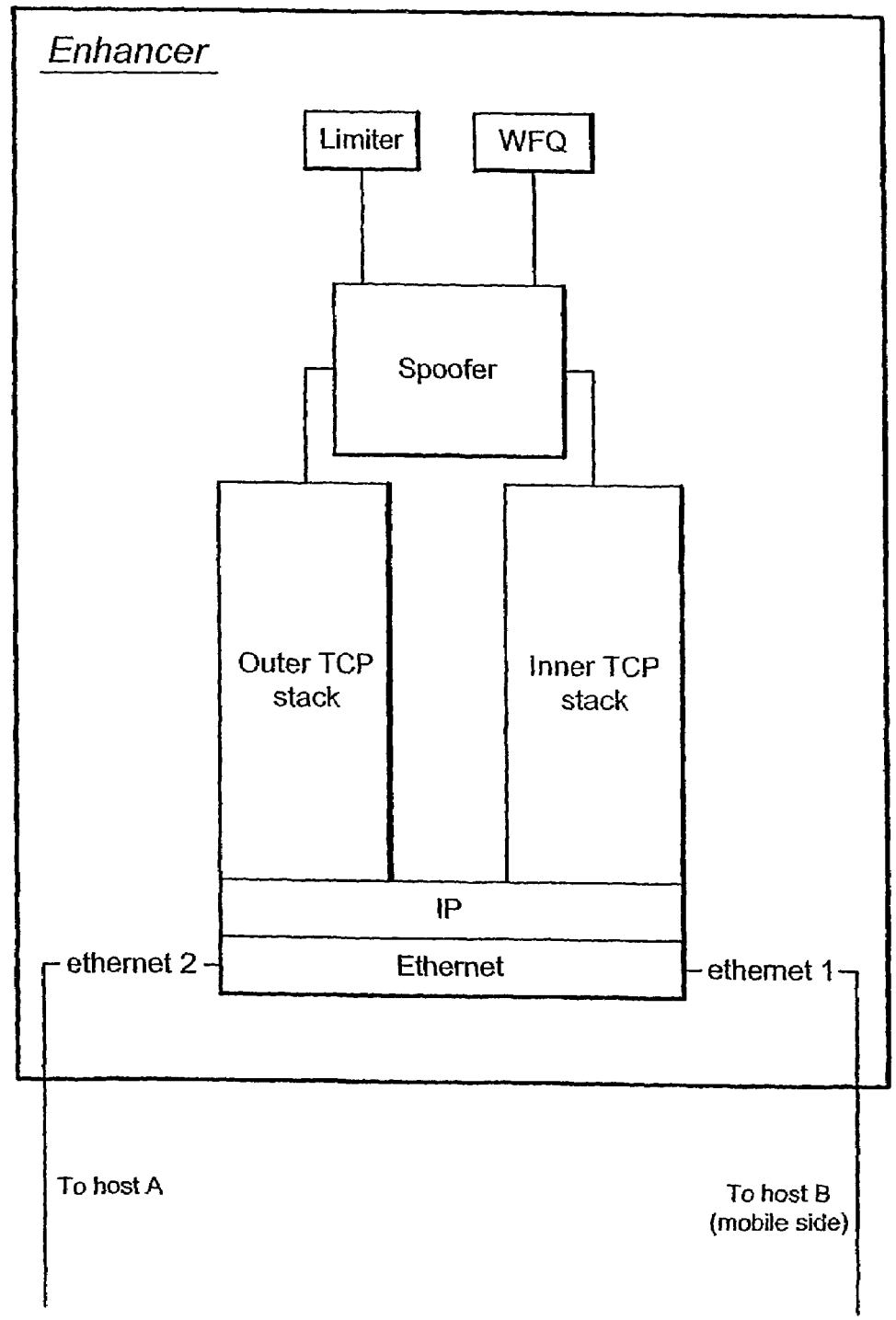
FIG. 6 shows a representation of an embodiment of the invention showing an example of the software architecture of the enhancer.

FIG. 6 shows a schematic representation of the one example of software architecture of an embodiment of the enhancer. The link to 'host B [mobile side]' is not directly to the mobile. This link carries the packets to the wireless access point, or Control Equipment (referred to hereafter as the 'CE').

Two TCP stacks, connected by the spoofer, sit above a single IP stack, which in turn sits above the ethernet layer. The limiting module estimates the fullness of the CE buffers and switches off the transfer of data, from the outer to the inner TCP stack, if the buffer is estimated to be too full. There is also a weighted fair queuing (wfq) module which controls the overall maximum data flow rate from the outer to the inner stack.

The CE has several buffers (one per mobile). If data is sent to the CE at too high a rate then these buffers could be flooded causing loss of packets. These packets would then need to be re-transmitted which would seriously impair the enhanced TCP performance. The enhancer has no direct way of querying the CE about how full these buffers are. Therefore a limiting module has been designed to estimate the fullness of these queues and, if necessary, tell the spoofer not to transfer any more data until the buffers have drained. The basic principle is to keep track of the minimum and mean RTT (round trip time) for each class (buffer). This is the time taken for an acknowledgement of a packet sent out from the inner TCP stack to arrive back at the inner stack. The minimum RTT is used as an indication of the inherent latency in the link Large RTTs which are thought to be due to retransmissions are ignored. If the mean RTT becomes larger than a certain multiple of the minimum RTT then it is assumed that the buffer is filling up (packets must queue in the buffer before being dealt with hence the RTT increases). In this case the spoofer is forbidden from sending any more packets for this class until either: A timeout occurs (this is a safety net and should not happen).

The Limiter Class

The limiter estimates that the buffer has drained sufficiently for data transfer to commence again In order to best describe how the limiting module works it is necessary to describe the central data structure to the module—the limiter class. One limiter class is maintained per buffer in the CE and has the following elements. A flag specifying whether the class is awake or asleep. The spoofer is not allowed to send data for a class that is sleeping. A packet loop. This loop contains several packets of data for the class (the configuration parameter loop_length). These packets are not the full packets being sent, but merely contain the necessary information to identify the TCP segment i.e. the source and destination IP address and port number, and the sequence number. The time between packets being logged in this loop is defined by the configuration variable time between logs. This packet loop has two main purposes. To keep track of RTTs and therefore determine when to send a class to sleep.

To determine when to awaken a sleeping class. Packets are logged every time between logs milliseconds. The inner TCP stack passes the relevant details to the limiter before it outputs the packet. Packets are only cleared from the packet loop when and ACK is received back at the inner TCP stack. At this point an RTT for the logged packet can be calculated.

The time the packet loop was last updated. This is logged to monitor when another packet should be logged in the packet loop. A marker for the loop head and loop tail. These are cyclic values modulo the loop length. The packet head represents the position to log the next packet, while the packet tail represents the oldest logged packet. Having a cyclic buffer ensures that a maximum of loop length meaningful packets can be stored at any given time. The time that the class was sent to sleep (only applies if the awake flag is set to FALSE). If the class is sent to sleep then the time is recorded so that it can be awakened if it is not awakened by an ACK of a packet in the packet loop within a set time period.

The mean and variance of the RTT. The minimum RTT and RTT count are also stored. If the mean of the RTT becomes larger than a certain multiple of the minimum RTT then the class is sent to sleep. The RTT count is initially ramped up to a maximum value. and used as a weighting factor when computing the new mean RTT from the old value, i.e.

$$\langle R \rangle_{new} = \langle R \rangle_{old} \left( \frac{R_c}{R_c + 1} \right) + R_{new} \left( \frac{1}{R_c + 1} \right)$$

where $\langle R \rangle_{new}$ is the new mean RTT, $\langle R \rangle_{old}$ is the old mean RTT, $R_{new}$ is the newly submitted RTT and $R_c$ is the RTT count. This 'ramping up' of the RTT count ensures that early RTTs (i.e. when the limiter is first started up) carry a greater weighting to the mean than later ones. Note that, as with all rolling mean calculations, the weighting factors (in the round brackets) add up to one. The variance of the RTT is used to estimate when an RTT is due to a re-transmission. These are ignored.

A flag which specifies whether or not RTTs should be ignored. Recall, RTTs are used to estimate when a class should be sent to sleep. When a class is sent to sleep, RTTs arising from packets logged from that time until the time the class was awoken are ignored. When the class is sent to sleep the flag ignore rtts is set to TRUE and te variable ignore until packet is set to the position that first packet after the class is woken up will be logged at. All packets previous to this in the packet loop are ignored (for the purposes of calculating RTTs). Once the packet at ignore until packet has been ack'ed the ignore rtts flag is set to FALSE. This technique makes sure that the mean RTT is not influenced by very large RTTs that have already effectively been acted upon (by sending the class to sleep). If these were not ignored then a class that had just been awoken would unnecessarily be sent back to sleep again.

Estimating the CE Buffer Fullness

Under the assumption that every packet sent to the CE buffer is logged in the limiter class loop and that there is no latency in the link, the limiter class loop will mirror exactly the state of the CE buffer. That is, the packet at the head of the limiter class loop will be at the back of the CE buffer queue and the packet at the tail of the limiter class loop will be at the front of the limiter class loop. Under the further assumption that the flows both in and out of the buffer are constant rate, the round trip times for these packets exactly equals length of the queue (in ms). Therefore the difference in log time between the packet at the head and the packet at the tail of the packet loop will be exactly the length of the CE buffer queue in ms (i.e. the time needed to clear the queue if no more packets were sent). These principles are those used to send a class to sleep and also awaken it. When the RTTs for packets in the class buffer become large than some multiple of the base RTT then the CE buffer is assumed to be filling up and the class is sent to sleep. When the difference in log time between the packet at the head and the packet at the tail of the packet loop becomes less than some multiple of the base RTT then the class is awoken.

Retransmission.

The provision of an assured layer-2 service (layer-2 are assumed to make use of ARQ acknowledgement repeat request schemes) on the link to the mobile host needs to be handled. Rather than a link with errors, it will now appear to the TCP to be a link with a highly variable RTT (any lower layer retransmission will cause the RTT to double). Because of the latencies involved this could cause end-to-end TCP to unnecessarily retransmit packets, as the increase in RTT may trigger a timeout.

The enhancer is able to manage this, as the retransmission timer can be altered to have a suitable minimum value that accounts for the possibility of layer-2 retransmissions. Assuming that the layer-2 is reliable means that it can be considered unlikely that this timeout will occur. If the timeout does trigger, then it may indicate that the link to the mobile host is temporarily disconnected.

Normal TCP backs-off in the event of a retransmission. That is, if a timeout occurs the packet is retransmitted. The timeout for this packet is then doubled. This is to avoid stress on the network. In the case with a mobile host, there may be (relatively) long periods of disconnection. If this exponential back-off were performed, it could take a long time for a packet to be sent which establishes that the link is available again. The enhancer, therefore, does not perform this back-off in the event of a retransmission. Instead, it keeps the original value of the retransmission timer and re-sends the dropped packet at a constant rate. This effectively polls the mobile host—it will elicit an immediate response when the link becomes available. This improves the response of the system over end-to-end TCP. In the upload case (data flowing from the mobile) there is one case where the enhancer can improve matters, and this is with lengthy disconnections. An unmodified TCP stack at the mobile host, if it does not receive an acknowledgement (due to radio link failure), will assume packet loss and retransmit. As described above, the TCP will exponentially back-off its retransmissions. This means that it will tend to take a long time to notice that the link has become available. The enhancer can improve the recovery in this case by detecting that the link to a given mobile is idle. In this case it should repeat the last acknowledgement sent on each connection at regular but infrequent intervals[1]. This will have the effect of 'kicking' the TCP at the mobile host into a response when the link becomes available. The detection of the link being idle (and thus potentially unavailable) can be described quite simply: if at least one TCP connection exists to the mobile and no TCP connections to that mobile has received a packet for a timeout period, then the link can be considered idle. The only cases in which this will be true is when the link is unavailable or when the connections all happen to be idle (i.e. there is no unacknowledged data outstanding or data waiting to be delivered). If the connections are idle, then the sending of duplicate acknowledgements will not affect the behaviour of the TCP stack on the mobile, so it is a neutral activity. It does consume some bandwidth, but the sending of an 'ack' packet every few seconds is not a heavy load. In the event that the link is unavailable, the TCP window advertised by the enhancer to the Internet hosts will be allowed to close. This signals to the sending TCP that the packets are being correctly received, but not being processed by the application. The enhancer will (as with standard TCP) send a 'window update' packet as soon as data starts being processed again to signal to the host that it can re-start sending. Additionally, if the window closes completely, the sending TCP will periodically send a 'window probe' to discover when the window opens (as the window update is not reliably delivered). The combined effect of the TCP 'kick' and the control of the sender by the enhancer mean that enhanced connections are able to recover much faster from a lengthy disconnection than normal, end-to-end TCP/IP.

The skilled person would realise that the enhancers according to the invention can be employed in a variety of different communication systems, and would know where the most suitable location would be. Of course a communication system especially a complex one with many links, may well benefit from a number of enhancers.

The invention claimed is:

1. A method of improving the flow of data in a communication system having at least two links that connect units, at least one link having multiple simultaneous connections, said method comprising;
   splitting at least one of said links into segments; and
   inserting into said at least one of said links at least one enhancer; wherein, said enhancer
   a) communicates with a unit upstream of the data flow such that the upstream unit perceives that it is communicating with at least one unit downstream of the enhancer;
   b) assessing an aggregate amount of unacknowledged data sent via the link having multiple simultaneous connections, the aggregate amount including data sent via each of the simultaneous connections, and obtaining a measure of efficacy of operation of the at least one downstream unit using the assessment of the aggregate amount of unacknowledged data; and
   c) dependent upon the measure, varies control of data flow sent to downstream units, by not sending data via a particular connection if the amount of unacknowledged data sent via that particular connection exceeds a first predetermined amount and the amount of said aggregate data exceeds a second predetermined amount; and
   wherein, the at least one downstream unit operates according to a standard TCP/IP protocol stack, without modification to accommodate insertion of the enhancer, and the aggregate amount of unacknowledged data is determined based on data from the standard unmodified protocol stack.

2. A method as claimed in claim 1, wherein said enhancer communicates with the upstream unit using standard TCP, and communicates with downstream units using a modified and adaptive protocol.

3. A method as claimed in claim 1, wherein the at least one enhancer is located where upstream links are generally faster than those downstream from the enhancer.

4. A method as claimed in claim 1, wherein the upstream unit is the Internet.

5. A method as claimed in claim 1, wherein the the link having multiple simultaneous connections is a wireless link.

6. A communication system comprising:
   at least two links that connect upstream and downstream units, at least one link having multiple simultaneous connections;
   at least one enhancer located by splitting at least one of said links into segments, and inserting said enhancer into said at least one of said links, said enhancer including means to communicate with a unit upstream of the data flow such that the upstream unit perceives that it is communicating with at least one downstream of the enhancer;
   means to assess an aggregate amount of unacknowledged data sent via the link having multiple simultaneous connections, the aggregate amount including data sent via each of the simultaneous connections, and to obtain a measure of efficacy of operation of the at least one downstream unit using the assessment of the aggregate amount of unacknowledged data; and
   means for adjustably controlling data sent to downstream units, dependent upon the said measure, by not sending data via a particular connection if the amount of unacknowledged data sent via that particular connection exceeds a first predetermined amount and the amount of said aggregate data exceeds a second predetermined amount;
   wherein, the at least one downstream unit operates according to a standard TCP/IP protocol stack, without modification to accommodate insertion of the enhancer, and the aggregate amount of unacknowledged data is determined based on data from the standard unmodified protocol stack.

7. A communication system as claimed in claim 6 wherein the at least one enhancer is located where upstream links are generally faster than those downstream from the enhancer.

8. A communication system as claimed in claim 6, wherein the upstream unit is the Internet.

9. A communication system as claimed in claim 6, wherein downstream links are wireless links.

* * * * *